Jan. 21, 1941.　　　　C. L. MATZ　　　　2,229,334
CANTING DEVICE
Filed Feb. 19, 1940
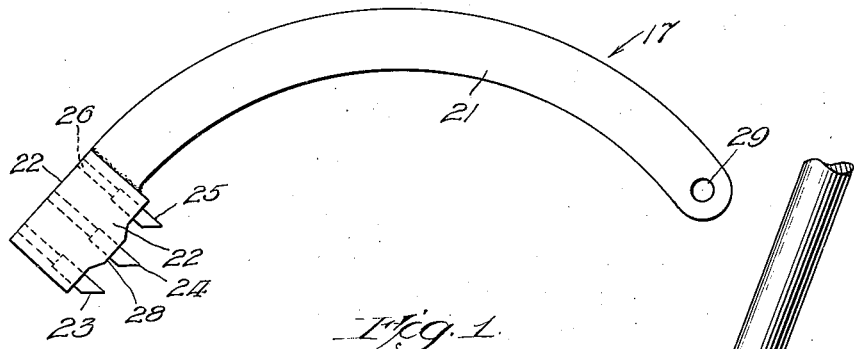
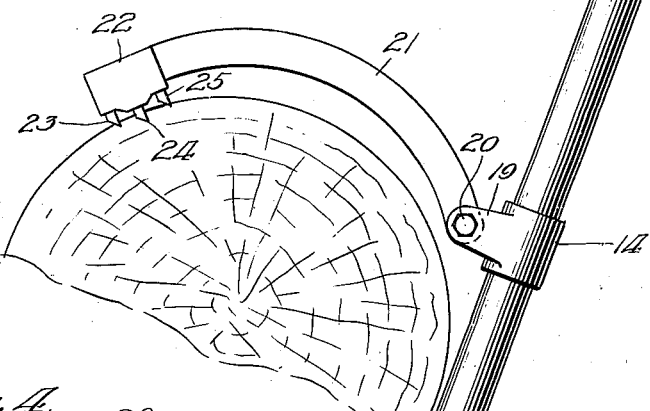
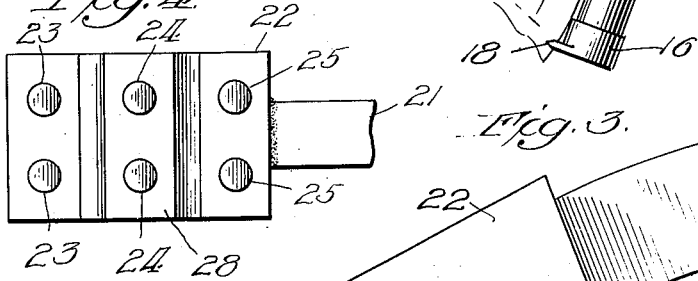
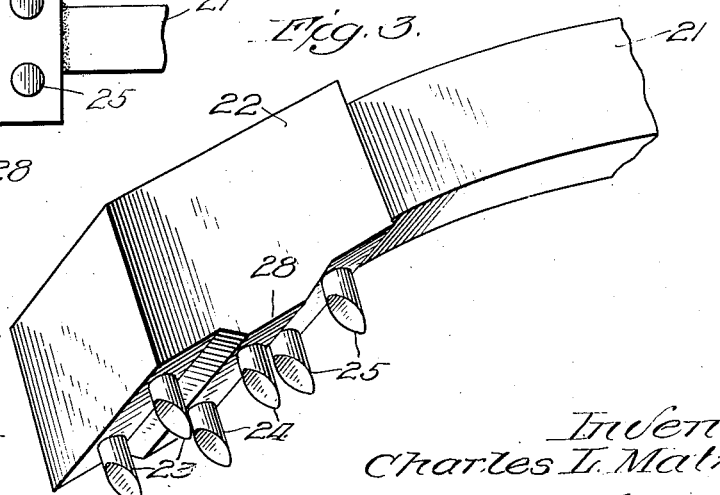
Inventor:
Charles L. Matz Patented Jan. 21, 1941

2,229,334

UNITED STATES PATENT OFFICE 2,229,334

CANTING DEVICE

Charles L. Matz, Chicago, Ill.

Application February 19, 1940, Serial No. 319,709

7 Claims. (Cl. 294—17)

This invention relates to improvements in canting devices and the like.

Heretofore, cant hooks as constructed, when used in connection with poles or logs, permitted substantially unlimited penetration of the hook point into the pole or log, which in most cases, seriously damaged the pole or log. It is recognized that moisture has an extremely deleterious effect on woody substances, particularly, where the moisture has been permitted to collect in pockets, formed as a result of an object piercing or penetrating the outer surface of the pole. Experience has proven that fungi breed in these moisture pockets, accelerate decay, and destroy the fibrous woody material, thereby materially shortening the service life of the pole.

To obviate the above disadvantages, the poles are often treated with a preservative which acts to inhibit the growth of fungi. This treatment, in some species of wood, generally penetrates the pole for about one-half inch beneath the surface thereof. It is obvious, that if an object penetrated the pole beyond the treated zone, the effect of the preservative would be nullified, since an untreated portion of a pole would be exposed and would provide a pocket in which moisture could collect and fungi could breed.

In working with poles and logs, it is highly desirable to use a canting device which effectively grips the pole or log, during the rolling or turning operation, but which quickly releases the same, as soon as the necessary operation has been performed. When it was required to roll or turn a log with the devices, heretofore used, the point of the engaging hook would become so deeply imbedded in the pole, that quick release could not be effected. As a result, the operator would often find it expedient to abandon the hook device, in order to avoid injury to himself. This is particularly hazardous in the case where a log or pole is being rolled from the top of a high pile. The momentum of the rolling log will often cause the hook device to fly off into space, causing injury to others, or the log will fall directly on the handle of the device, breaking it and necessitating replacement thereof.

In accordance with the foregoing, it is therefore, an object of this invention to provide a canting device which provides for a predetermined limited penetration into the log or pole on which it is to be used.

A further object of this invention is the provision of a canting device which efficiently grips a pole or log for a rolling or turning operation and which acts to release itself therefrom, when the handle, in its operation, passes a vertical axis.

A further object of this invention is the provision of a canting device which will function, equally as well, with poles and logs of large and small diameter.

A further object of this invention is the provision of a canting device having a plurality of rows of tines which are replaceable when damaged or dulled in use.

A still further object of this invention is the provision of a device of the character described which is simple in construction, highly efficient in purpose and inexpensive to manufacture.

These and other objects and advantages will be apparent during the course of the following description.

In the accompanying drawing, forming a part of this specification, and in which like numerals are employed to designate like parts throughout the same, Fig. 1 is an elevational view of my improved canting device, showing the same as applied to a log or pole.

Fig. 2 is an enlarged elevational view of the gripping member.

Fig. 3 is an enlarged fragmentary perspective view of the gripping portion of my improved device.

Fig. 4 is an enlarged fragmentary plan view of the gripping portion shown in Fig. 3.

Referring to the drawing, wherein is shown a preferred embodiment of my invention, the numeral 12 designates a handle on which is mounted a strap or collar member 14 and a ferrule or heel member 16 provided with a spur or projection 18 which is adapted to engage a pole or log. The collar member 14 is provided with integrally formed lugs 19 which carry, in registering holes, a pintle 20 which affords pivotal support for the gripping member indicated, generally, by the numeral 17 and presently to be described. The gripping member 17 comprises a shank portion 21, substantially arcuately shaped, and a pole engaging member 22, at one extremity thereof. A hole 29 is provided at the other extremity of the shank 21 for receiving the pintle 20. The log engaging member 22 may be integrally formed with the shank 21 or may be suitably secured thereto, as by welding. The said member comprises a body portion having a relatively greater width than the shank 21. It will, however, be understood that the member 22 may be of any desirable shape.

The member 22 has a centrally disposed, embossed or raised portion 28 and is provided with a plurality of drilled holes 26 disposed in planes parallel to the longitudinal axis of the shank 21, the said holes being counter-bored and reamed to receive outwardly projecting tines 23, 24 and 25 which are press-fitted therein. A shoulder, formed at the juncture of the drilled and counter-bored portions of the holes 26, provides a seat for the tines, when in position.

As shown in the drawing, the tines consist of relatively short cylindrical sections which are bevelled to provide a substantially pointed extremity. The central tines 24 extend slightly beyond the tines 23 and 25, all being mounted so that the bevelled surfaces are directed away from the handle. Thus, when the device is in operating position, the tines engage a log or pole with a minimum bearing surface facing in the direction of the torque applied to the pole. Although the tines are caused to penetrate the surface of the pole, the penetration is limited by the member 22 which serves as a shoulder against which the pole surface will abut.

It is to be noted that it is intended that the tines be of relatively short length and of small cross sectional area, since the purpose of this invention could not otherwise be accomplished. Preferably, the tines, when mounted, should not extend from the member 22, to a height greater than the depth of the treated area of the pole on which the device is to be used. It is apparent that in the case where a single hook is used, substantially deep penetration thereby must be effected to provide for effective gripping. The objections to deep penetration have been previously pointed out. In my construction, I achieve effective gripping, without deep penetration, by providing a plurality of tines disposed in a plurality of planes for distributing, over a relatively greater area, the torque applied to the pole. It will also be seen that because of the enlarged dimensions of the member 22, in proportion to the shank, the device is securely anchored in the pole or log and lateral motion or side sway of the handle is substantially reduced.

It will be observed, that due to the particular shape of the extremities of the tines, penetration in a log or pole is substantially on a line, radially of the center of the pole. As the pull on the handle is increased, the tines more deeply penetrate the pole, until a predetermined maximum penetration is reached. Because of this, the danger of a hook slipping and tearing a gash in a pole or log, is substantially reduced, as would be the case, with devices of this character, heretofore used. It will also be observed, that due to the limited penetration and the shape of the tines, a slight movement of the handle, in the opposite direction, will cause the tines to disengage the pole and will release the device therefrom, thereby providing for greater safety to the operator.

My device is adapted to function, equally as well, with poles of comparatively large or small diameters.

Fig. 1 illustrates how the gripping member would engage a pole of standard size, such as is generally used in transmission and distribution lines. It is seen that, in this instance, all of the tines engage the pole, the central tines 24 being in relatively deeper penetration than the others.

In the case of a pole having a very large diameter the tines 23 and 24, only, will be in engagement with the pole. In the case of a pole of relatively small diameter the tines 24 and 25 will engage the pole. It will be apparent, that regardless of the size of the pole or log to be turned or rolled, a plurality of tines will, in all instances, be in engagement with the pole or log.

It is to be understood that the form of my invention, herewith shown and described, is to be taken as a preferred example of the same, and that various changes in the shape, size and arrangement of parts may be resorted to, without departing from the spirit of my invention or the scope of the appended claims.

I claim:

1. A canting device including a gripping element formed of a relatively enlarged member, the central portion thereof being raised above the end portions, a plurality of tines disposed in the central portion and in the end portions of said member, the centrally disposed tines projecting beyond the other of said tines, the said tines being so arranged that a plurality of tines will always engage with predetermined limited penetration articles of various sizes to be handled, thereby distributing the applied stress over a relatively large area of said articles.

2. A canting device having a gripping element formed of a relatively enlarged member, the said member having a face, the central portion of which is raised above the end portions, a plurality of tines projecting from said face, the centrally disposed tines extending beyond the other of said tines but cooperating with some of said other tines to engage articles to be handled, the articles to be handled even though of various sizes being thereby penetrated to a predetermined degree by a plurality of tines and the stress applied to said articles being distributed over a relatively large area of said articles.

3. A canting device including a pivotally movable gripping element having a plurality of tines extending from the face thereof, the centrally disposed tines projecting beyond the other of said tines, but cooperating with some of said other tines to penetrate articles to be handled, means for limiting the penetration of said tines whereby the articles to be handled are penetrated to a predetermined degree and the stress applied to said articles is distributed over a relatively large area of said articles.

4. In a canting device, a pivotally movable gripping element having on the face thereof a raised central portion extending in a direction parallel to the pivotal axis of said gripping element, a plurality of tines projecting substantially the same lengths from the face of said element, the tines disposed in said central portion however projecting beyond the other of said tines but with some of said other tines arranged to engage articles to be handled, the said articles thereby being penetrated to a predetermined degree by a plurality of tines and the stress applied to said articles being distributed over a relatively large area of said articles.

5. A canting device including a pivotally mounted shank having, at one extremity thereof, a plurality of tines adapted for penetration into an article to be handled, the said tines being disposed in a plurality of planes parallel to the longitudinal axis of said shank and being arranged to distribute the applied stress over a relatively large area of said article, and means for limiting the penetration of said tines in said article whereby injury to the article is avoided and the device is rendered readily disengageable from said article.

6. A canting device including a pivotally mounted shank having a gripping element at one extremity thereof, a plurality of tines adapted for penetration into an article to be handled, said tines being removably mounted on said gripping element and being arranged thereon with respect to the longitudinal axis of said shank so that any stress applied to said article will be distributed over a relatively large area of said article, and means for limiting the penetration of said tines in said article whereby injury to the article is avoided and the device is rendered readily disengageable from said article.

7. A canting device including a pivotally mounted shank having, at one extremity thereof, a plurality of tines adapted for predetermined limited penetration into an article to be handled, the said tines being arranged with respect to the longitudinal axis of said shank so that any stress applied to said article will be distributed over a relatively large area of said article whereby injury thereto is avoided and the device is rendered readily disengageable therefrom.

CHARLES L. MATZ.